United States Patent [19] | [11] Patent Number: 4,927,257
Enterline et al. | [45] Date of Patent: May 22, 1990

[54] KINEMATIC TRUSS

[75] Inventors: David L. Enterline, San Jose; Hugh L. Smith, Palo Alto, both of Calif.

[73] Assignee: Ford Aerospace Corporation, Newport Beach, Calif.

[21] Appl. No.: 239,083

[22] Filed: Aug. 31, 1988

[51] Int. Cl.⁵ .............................................. G02B 7/182
[52] U.S. Cl. .................................... 350/631; 126/438; 248/475.1; 343/878
[58] Field of Search ................ 350/631; 343/765, 878, 343/885; 248/183, 475.1, 476, 479; 126/438, 451

[56] References Cited

U.S. PATENT DOCUMENTS

| | | | |
|---|---|---|---|
| 3,105,969 | 10/1963 | Banche et al. | |
| 3,239,839 | 3/1966 | Banche et al. | |
| 3,392,398 | 7/1968 | Bowditch | |
| 3,438,039 | 4/1969 | Altmann | |
| 3,680,144 | 7/1972 | Low et al. | |
| 3,999,184 | 12/1976 | Fuss, III | 343/765 |
| 4,395,581 | 7/1983 | Girard | 126/438 |
| 4,433,337 | 2/1984 | Smith et al. | 343/765 |
| 4,457,297 | 7/1984 | Sobczak et al. | 126/438 |
| 4,463,749 | 8/1984 | Sobczak et al. | 126/451 |
| 4,535,961 | 8/1985 | Sobczak et al. | 350/631 |
| 4,566,432 | 1/1986 | Sobczak et al. | 126/438 |

OTHER PUBLICATIONS

McGraw-Hill Encyclopedia of Engineering (1982), pp. 402–405, "Four-Bar Linkage."

Primary Examiner—Bruce Y. Arnold
Assistant Examiner—Martin Lerner
Attorney, Agent, or Firm—Edward J. Radlo; Kenneth R. Allen; Keith L. Zerschling

[57] ABSTRACT

A telescope body is disclosed. The telescope body generally includes a primary structure for holding a mirror, a secondary structure for holding a means for receiving a reflection from the mirror, and a mounting section connecting the primary and secondary structure. The primary and secondary structures include four-bar linkages which have linkage action planes intersecting at the focal point of the mirror. Apparatus for preventing the secondary structure from intruding in a raypath of light to the means for receiving a reflection is also disclosed.

18 Claims, 2 Drawing Sheets

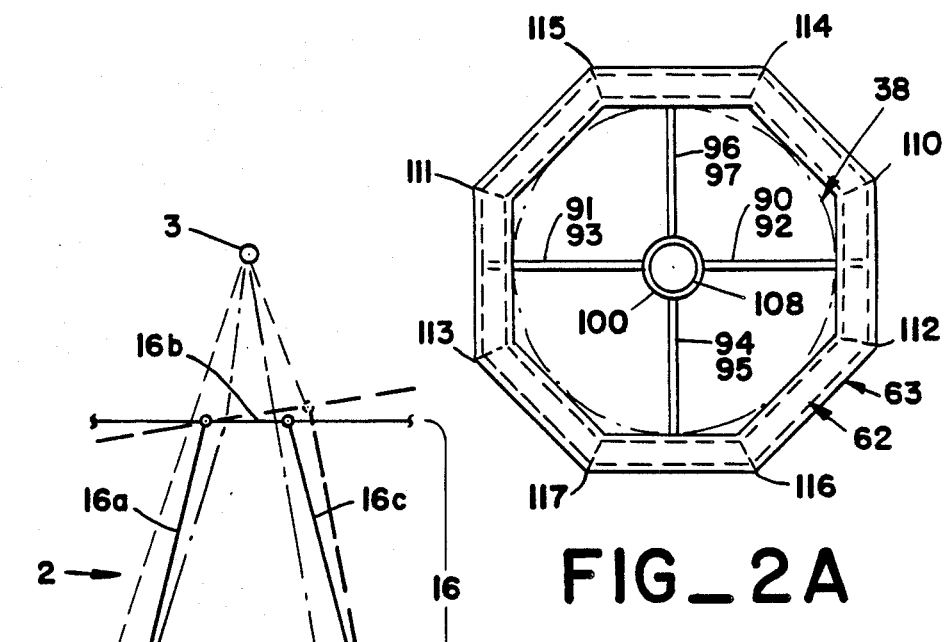
FIG_2A
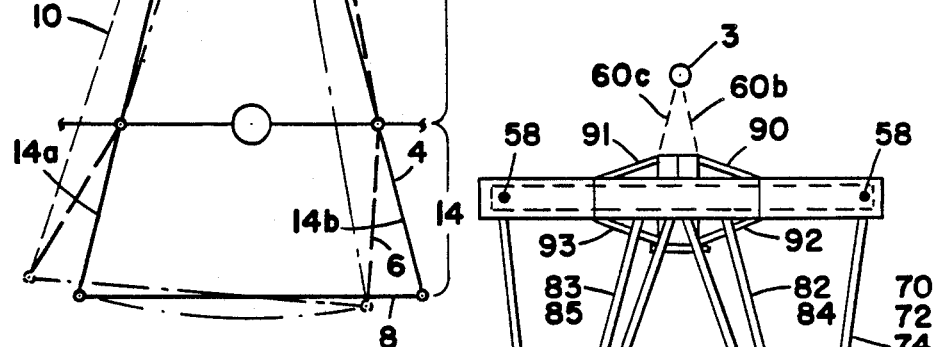
FIG_1
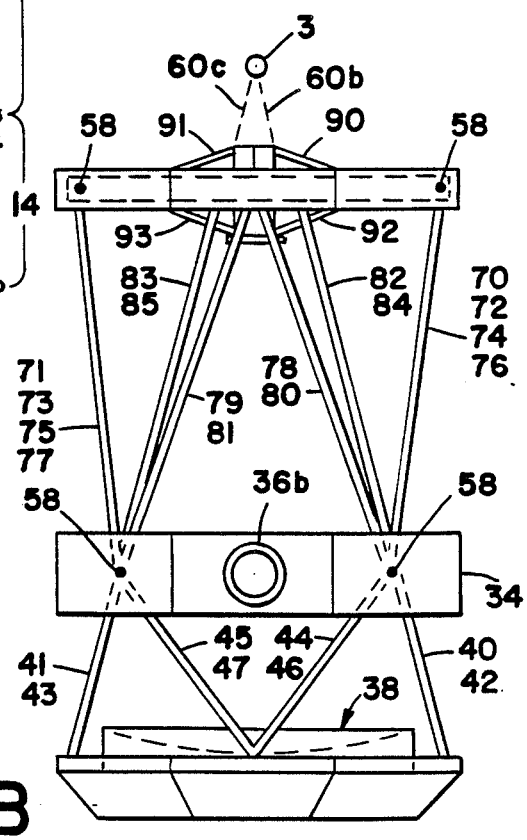
FIG_2B

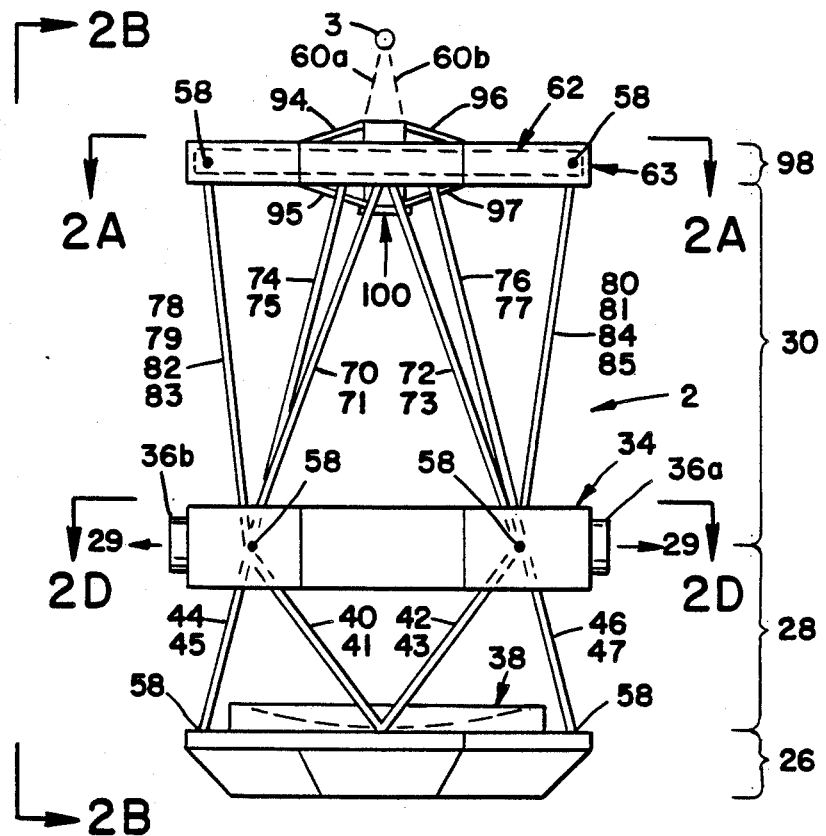
FIG_2C
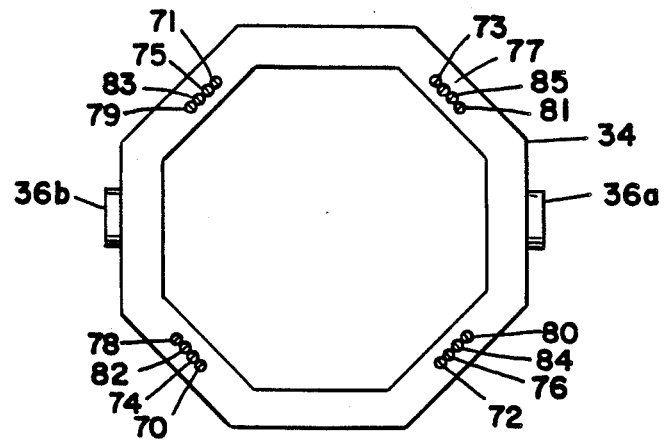
FIG_2D

KINEMATIC TRUSS

BACKGROUND OF THE INVENTION

1. Field of the Invention

The present invention relates to the field of truss structures. In particular, the present invention provides a greatly improved truss for a reflecting type telescope.

2. Description of the Related Art

In the construction and use of telescopes and, in particular, large telescopes, it is commonly found that deformation of the telescope frame occurs under various loads such as gravity, inertia, and wind. The size of many modern telescopes is such that the deformation caused by these forces results in defocusing the telescope.

In order to overcome the problems associated with these deformations, a common solution has been to use large, stiff structural members within the body of the telescope to control the deformation to within acceptable limits. This solution has the apparent drawbacks of the high weight and cost of the telescope and its associated hardware.

Telescopes have utilized a Serrurier Truss. The Serrurier Truss is a type of four-bar linkage which provides parallel movement of primary and secondary structures in the telescope. It, therefore, becomes necessary to "balance" the stiffness of the primary and secondary trusses so that gravity load deformations do not defocus the telescope, i.e., the body is designed such that when a force is applied, the amount of deflection occurring in the upper portion of the telescope is roughly equal to that occurring in the bottom portion of the telescope. The use of a Serrurier Truss in a telescope, however, does not maintain telescope focus under conditions created by wind, acceleration (from, for example, rotation of the telescope), and other similar types of loads. The sets of parallel trusses are not parallel and bear no relation to the focal point in a Serrurier Truss. Mt. Palomar is an example of a telescope using such a truss.

SUMMARY OF THE INVENTION

A telescope truss system is disclosed which utilizes a geometry that permits the telescope to remain focused even under wind, acceleration, and gravity loads. The truss system utilizes multiple four-bar linkages having orientations relating to the focal point of the telescope optics in its geometry, permitting the telescope body to flex, yet retain the telescope in a focused condition.

In one embodiment the truss includes a primary structure for holding a reflective device and a means for obtaining a reflection from the reflective device. The reflective device can be a mirror and the device for obtaining can be a second mirror. The second mirror could be replaced with, for example, a camera, or an electronic detector. The technology could also be applied to radio telescopes and the like in which case the device for obtaining would be a metallized surface for reflecting radio energy.

The means for obtaining a reflection and the primary structure are linked by a truss system. The primary structure preferably comprises a plurality of four-bar linkages in which the plane of each of the linkages intersect substantially at a focal point of the reflective device. By "planes of the linkage" it is meant a plane drawn through the truss members of the linkage.

In a preferred embodiment, the truss system further comprises a secondary structure, the secondary structure holding the means for obtaining a reflection. The secondary structure may be a plurality of second four-bar linkages in which the planes of the second four-bar linkages also intersect at a focal point of the reflective device.

Alternatively, in order to prevent the secondary structure from intruding in the raypath of light from the reflective device, a two-ring, four-bar truss system is described for the upper portion of the telescope.

DESCRIPTION OF THE DRAWINGS

FIG. 1 schematically illustrates the use of a four-bar linkage in a telescope body.

FIG. 2A is a detailed drawing of the telescope tube viewed from above (top view).

FIG. 2B is a detailed drawing of the telescope body in side view.

FIG. 2C is a detailed drawing of the telescope body viewed in front view.

FIG. 2D is a top view of the center section.

DETAILED DESCRIPTION OF THE INVENTION

The present invention provides a new design geometry, particularly for use in the design of telescope bodies, which maintains a constant focal point without regard to structural stiffness or the type of lateral load applied to the structure.

FIG. 1 generally illustrates the concept of the kinematic truss described herein and illustrates its usefulness when applied to a telescope 2 with a focal point 3. FIG. 1 shows the telescope body in an "unflexed" state in bold lines 4 and in an exaggerated "flexed" state in dashed lines 6. The focus position of a primary mirror 8 when the body is in the flexed state is illustrated with dashed lines 10. As seen from FIG. 1, the result of the arrangement of members in the truss system is that the mirror 8 is not defocused because it retains a fixed orientation with respect to a focal point 3, thereby preventing the telescope from being defocused.

The truss system uses four-bar linkages to provide a kinematic truss system that causes the primary structure 14 and secondary structure 16 to rotate about the focal point 3 of the telescope. Two four-bar linkages are illustrated in FIG. 1. The primary structure four-bar linkage is defined by member 14a, the center section, member 14b, and the mirror section 8. The secondary four-bar linkage is defined by member 16a, member 16b, member 16c, and the center section. FIG. 1 shows that using the four-bar linkages, the laterally displaced primary structure 14 and secondary structure 16 tilt when a load is applied in a lateral direction in the plane of the mirror. This action occurs because members 14a and 14b of the primary structure and members 16a and 16c of the secondary structure are located in planes that intersect at the telescope focus and, therefore, the primary and secondary structures rotate about this point. Once the telescope has been focused, the truss system maintains the focus position while the telescope is being operated, even under acceleration loads.

More detail regarding a telescope according to the invention is provided in FIGS. 2A, 2B, and 2C. In general, the telescope body includes a primary mirror cell structure 26, a primary mirror cell support truss section 28, a secondary truss section 30, and a secondary ring-and-spider section 34. Center section 34 links the primary and secondary truss and further provides telescope mounting points 36a and 36b. Mounting points 36a and b may be mounted to apparatus for positioning the telescope in a desired position (not shown) and may include, for example, apparatus for rotating the telescope about axis 29, as shown in FIG. 2C. Primary mirror cell structure 26 holds mirror 38.

Rigid body motion of the primary mirror 38 about its focal point 3 is established by a four-bar linkage between the primary mirror cell 26 and the center section 34. The primary mirror cell support truss, comprising members 40, 41, 42, 43, 44, 45, 46, and 47, provide this movement by hinged action at the ends of the members with the hinge points 58. Two, four-bar linkages are formed in the bottom section. Referring to FIG. 2C, the first four-bar linkage is formed by members 44 and 45 (on the left), the mirror support section 26, members 46 and 47 (on the right), and the center section 34. The second four-bar linkage is formed by members 41 and 43 (on the back), the mirror support section 26, members 40 and 42 (on the front), and the center section 34.

A plane drawn through the two left members of the first four-bar linkage 44 and 45, and projected upwards passes through the focal point, as shown by 60a in FIG. 2C. A plane drawn through members of the first four-bar linkage, 46 and 47, and projected upwards also passes through the focal point, as shown by 60b in FIG. 2C. A similar arrangement is provided for the front and rear member pairs 40, 42 and 41, 43. These planes, known as "linkage action planes", 60a-d all intersect at the focus of the primary mirror. The lines established by the intersection of planes 60a-60b and 60c-60d are orthogonal (i.e., perpendicular) to each other and to the telescope tube axis.

The linkage system diagrammatically illustrated in FIG. 1 provides the desired focus control movement of the structures that support the telescope optics but it would be structurally unstable (i.e., it would collapse) without additional constraints. Independent constraint to prevent instability for the primary mirror cell support truss is provided by using two truss members in the adjacent side planes as shown in FIG. 2 and discussed above. Therefore, for example, when a force is applied in the plane of the primary mirror cell in the direction of the left or right of the telescope, the front and rear trusses, members 40, 41, 42, and 43, resist the load. Conversely, when a force is applied in the plane of the primary mirror in the direction of the front or rear of the telescope, the left and right truss members 44, 45, 46, and 47, resist the load. Therefore, the primary mirror cell support truss member sizes are based on stress rather than deflection criteria. Further, the telescope may be designed to permit significant deflection without being defocused.

The secondary truss may be constructed in a fashion similar to the primary truss as described above. Preferably, however, the secondary truss is modified to prevent the secondary truss from intruding within the light path of the primary mirror.

The secondary truss 30 (which holds the secondary assembly 98) includes planar trusses and linkage bars at four sides of the structure. The truss and linkage members connect at hinge points 58 to the center section 34, an inner secondary support ring 62 and outer support ring 63. The inner and outer support rings have independent tilt movements that are controlled by their respective linkage members.

Two four-bar linkages are formed in the upper section. The first four-bar linkage is formed by linkage members 74 and 75 (on the left), the center section 34, linkage members 76 and 77 (on the right), and the outer ring 63 (referencing FIG. 2C). The second four-bar linkage is formed by linkage members 82 and 84 (in the front), the center section 34, linkage members 83 and 85 (in the back), and the inner ring 62.

Hinged ends 58 of the linkage members are again located in the linkage action planes 60a-d. Therefore, the inner and outer secondary support rings tilt as rigid bodies about the focal point 3. Front and rear spider trusses (members 90 through 93) connect to the inner ring 62 and the right and left spider trusses (members 94 through 97) connect to the outer ring 63. Front and rear secondary outer ring support truss members 70 through 73 are connected to the outer ring 63 and right and left secondary inner ring support truss members 78 through 81 are connected to inner ring 62. Front and rear secondary inner ring support linkage members 74 through 77 are connected to the outer ring 63 and right and left secondary inner ring linkage members 82 through 85 are connected to the inner ring 62. The spider trusses combine the rigid body movement of the rings at the secondary support structure 108. The tilt of secondary mirror 100 is controlled by ring support linkage bars, members 74 through 77 and 82 through 85, that provide rigid body tilt movement about the focus point.

Members 70, 71, 72, and 73; and members 78, 79, 80, and 81 restrain translation of the secondary rings without restraining a desirable linkage tilt effect. For lateral loads applied in the plane of the secondary ring, these truss members are the only members that develop loads. Since the linkage members are not loaded, they provide the desired tilt motion and the truss member sizes can be established based on stress criteria, again allowing significant movement of the body without defocusing.

To stabilize the two-ring truss systems in their out-of-plane directions the two rings are connected with secondary ring radial struts, members 110 through 117. These rod-type strut members only restrain in-plane translation movement between the two rings and allow the desired independent tilt movements. Thus, a stable system of members has been developed outside the optical clearance diameter that provides controlled secondary rigid body movement about its focus point.

In all of the above embodiments, the "hinge" points may be constructed in any one of a variety of ways readily known to those of skill in the art. For example, the hinge points may be ball joints, pinned hinges, or a flex plate. The members of the telescope body are constructed of materials readily known to those of reasonable skill in the art. For example, aluminum, steel, and various alloys could all be utilized.

It is to be understood that the above embodiments are intended to be illustrative and not restrictive. The invention has been illustrated by way of a telescope, because of the need to maintain such telescopes within fine tolerances in order to maintain focus. The above described ideas could be used, however, in radio telescopes, microwave applications, and the like. The invention could also find utility in devices used to transmit radio waves and the like. The scope of the invention should, therefore, not be determined with reference to the above description but instead should be determined with reference to the appended claims along with the full scope of equivalents to which the claims are entitled.

What is claimed is:

1. Apparatus for receiving a focused image comprising:
(a) a primary structure for holding a reflective device; and
(b) means for obtaining a reflection from the reflective device, said means for obtaining a reflection and said primary structure linked at a mounting means for the apparatus for receiving a focused image by a truss system, said primary structure further comprising a first primary four-bar linkage defining linkage action planes, the linkage action planes of the first primary four-bar linkage intersecting substantially at a focal point of the reflective device.

2. Apparatus as recited in claim 1, wherein said reflective device is a telescope mirror.

3. Apparatus as recited in claim 1 further comprising a second primary four-bar linkage, said second primary four-bar linkage having linkage action planes orthogonal to the planes of the primary linkage.

4. Apparatus for receiving a focused image comprising:
(a) a primary structure for holding a reflective device; and
(b) means for obtaining a reflection from the reflective device, said means for obtaining a reflection and said primary structure linked at a mounting means by a truss system, said primary structure further comprising a first primary four-bar linkage defining linkage action planes, the linkage action planes of the first primary four-bar linkage intersecting substantially at a focal point of the reflective device, said truss system further comprising a secondary structure, said secondary structure comprising a secondary four-bar linkage, the linkage action planes of the secondary four-bar linkage intersecting substantially at a focal point of the reflective device.

5. Apparatus as recited in claim 4 further comprising means for preventing said secondary structure from intruding in a ray path from said reflective device to said means for obtaining a reflection.

6. Apparatus as recited in claim 4, wherein said secondary four-bar linkage further comprises:
(a) a first secondary four-bar linkage acting in a lateral direction;
(b) a second secondary four-bar linkage said second secondary four-bar linkage acting in a direction perpendicular to said first secondary four-bar linkage;
(c) a spider truss holding said means for obtaining a reflection, said spider truss having side links connected to a first ring and front and rear links connected to a second ring; and
(d) said first secondary linkage connected to said first ring and said second secondary four-bar linkage connected to said second ring.

7. Apparatus as recited in claim 6 further comprising means for stabilizing said primary structure and said secondary structure.

8. A telescope body comprising:
(a) a primary mirror support section;
(b) a secondary support section; and
(c) a truss system, said truss system linking said primary mirror support section and said secondary support sections at a telescope mount, said truss system further comprising:
(i) a center section; and
(ii) at least four primary mirror support truss members, said center section, and said mirror support section, and said at least four primary mirror support members forming a four-bar linkage, said at least four primary mirror support members lying in planes intersecting at a focal point of a mirror in said primary mirror support section.

9. Apparatus as recited in claim 8, wherein said truss system further comprises at least four secondary mirror support truss members, said center section, said secondary mirror support section forming a secondary four-bar linkage.

10. Apparatus as recited in claim 9 further comprising means for preventing said secondary four-bar linkage from intruding in a ray path from said primary mirror support section to said secondary support section.

11. Apparatus for receiving a focused image comprising:
(a) a truss system for holding a reflective device;
(b) means for obtaining a reflection from the reflective device, said means for obtaining and said truss system linked by a secondary structure at a mounting means for the apparatus for receiving, said secondary structure further comprising a secondary four-bar linkage, the linkage action planes of the four-bar linkage intersecting substantially at a focal point of the reflective device.

12. A telescope kit comprising:
(a) a reflective means;
(b) means for receiving an image from the reflective means;
(c) mounting means for the telescope; and
(d) truss means to connect said reflective means to said mounting means and, further, said mounting means to said means for receiving, said truss means adapted to rotate said reflective means about a focus point when an acceleration force is applied to said mounting means.

13. A kinematic truss system comprising:
(a) a primary structure for holding a reflective device; and
(b) means for holding, said means for holding and said primary structure being linked at a mounting means for the kinematic truss system by a secondary truss system, said primary structure further comprising a first primary four-bar linkage defining linkage action planes, the linkage action planes of the first primary four-bar linkage intersecting substantially at a focal point of the reflective device.

14. A kinematic truss as recited in claim 13, wherein said reflective device is a telescope mirror.

15. A kinematic truss as recited in claim 13, wherein said means for holding further comprises a means for receiving a reflection from the reflective device.

16. A kinematic truss as recited in claim 13 further comprising a second primary four-bar linkage, said second primary four-bar linkage having linkage action planes orthogonal to the planes of the primary linkage.

17. A kinematic truss system comprising:
(a) a primary structure for holding a reflective device; and
(b) means for holding, said means for holding and said primary structure being linked at a mounting means by a secondary truss system, said primary structure further comprising a first primary four-bar linkage defining linkage action planes, the linkage action planes of the first primary four-bar linkage intersecting substantially at a focal point of the reflective device, said secondary truss system further comprising a secondary four-bar linkage, the linkage action planes of the secondary four-bar linkage intersecting substantially at a focal point of the reflective device.

18. A kinematic truss as recited in claim 17 further comprising means for preventing said secondary four-bar linkage from intruding in a ray path from said reflective device to said means for obtaining a reflection.

* * * * *